E. G. CRONK.
RAKE.
APPLICATION FILED DEC. 11, 1913.
1,118,397.
Patented Nov. 24, 1914.
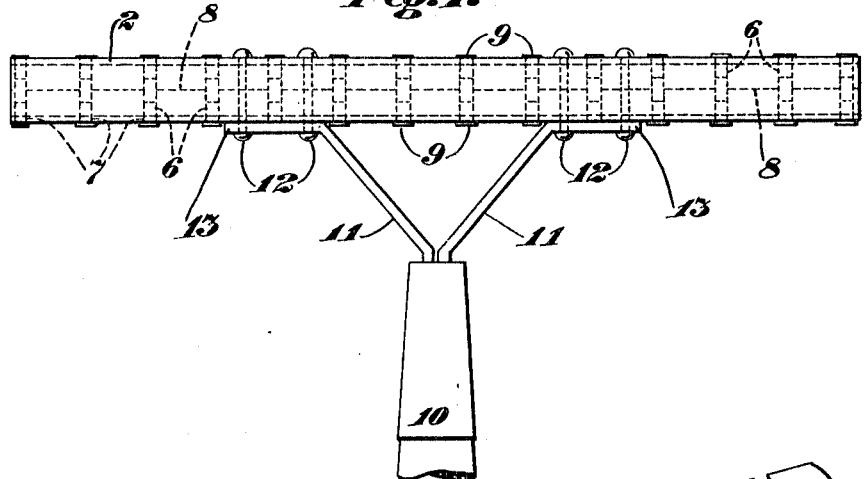
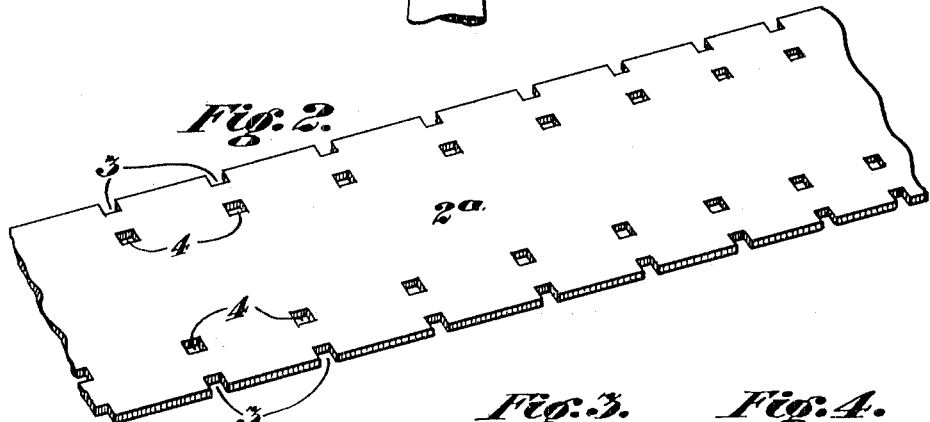
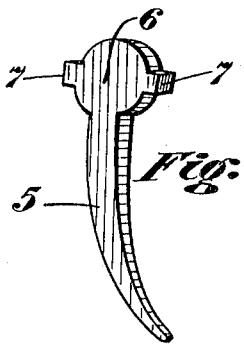
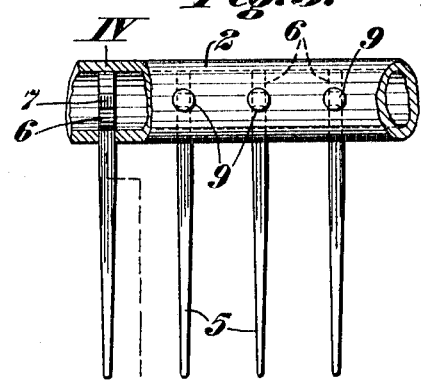
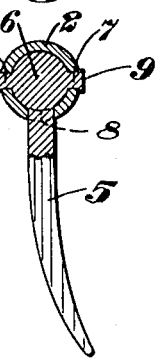
Witnesses:
Inventor:
Edward G. Cronk
by C. M. Clarke
his attorney

UNITED STATES PATENT OFFICE.

EDWARD G. CRONK, OF MONTOUR FALLS, NEW YORK, ASSIGNOR TO THE CRONK & CARRIER MANUFACTURING COMPANY, OF ELMIRA, NEW YORK, A CORPORATION OF NEW YORK.

RAKE.

1,118,397.      Specification of Letters Patent.      Patented Nov. 24, 1914.

Application filed December 11, 1913. Serial No. 805,942.

*To all whom it may concern:*

Be it known that I, EDWARD G. CRONK, a citizen of the United States, residing at Montour Falls, in the county of Schuyler and State of New York, have invented certain new and useful Improvements in Rakes, of which the following is a specification.

My invention consists of an improvement in garden and other rakes, and has for its object to provide a strong durable tool of this class made entirely of high carbon wrought steel or other available suitable metal having a handle portion.

An important feature of improvement in the invention is the manner in which the several parts are assembled and connected, whereby to effect a practically continuous, rigid construction, utilizing a tubular head or body portion for the rake, and a plurality of suitably spaced teeth having circular head portions embraced thereby, with a suitable connecting handle, constructed in the manner more fully hereinafter described.

The invention is illustrated in the accompanying drawings, in which—

Figure 1 is a plan view of the rake head. Fig. 2 is a perspective view of a portion of the blank from which the tubular head is formed. Fig. 3 is a partial sectional view of a portion of the head of the rake with a number of teeth. Fig. 4 is a cross sectional detail view, indicated by the line IV. IV. of Fig. 3. Fig. 5 is a perspective detail view of one of the teeth.

The head portion of the rake consists of a tubular bar member 2 formed of a flat blank 2ª, shown in Fig. 2, of a length co-extensive with the length of the finished rake head, and of a width to form the tubular head when bent around into form with its edges in abutting contact.

As shown, the blank 2ª is provided along each opposite edge with series of openings 3, preferably rectangular, and registering with each other in pairs at opposite edges. Inwardly of the body portion of the blank, and in transverse alinement with openings 3, are additional openings 4, preferably rectangular in form.

The teeth 5, which may be of any formation as to their shank portion, but which are preferably rectangular, extend integrally from head 6 adapted to fill the interior of tubular head 2. At opposite sides of the teeth head 6 are laterally projecting lugs or extensions 7, 7, adapted to neatly interfit within the openings 4 of blank 2ª, when it is bent around the teeth head. Likewise, the edge openings 3 fit around the edges of shank teeth 5 immediately underneath the head 6, the opposite edges of the blank making abutting contact, as indicated at 8, Fig. 4.

When thus assembled, and the several teeth are thus fixedly held within the tubular head 2, the lugs 7, which project outwardly slightly beyond the curved surfaces of head 2, are then riveted, as indicated at 9, thus fixedly securing the parts in position and finishing the ends of projections 7 down practically to the surface of the main head 2. The meeting edges of the head, along its under side are welded together, preferably by the electric welding process, which at the same time welds the head itself to the several teeth and its parts, thus supplementing the mechanical action and producing a practically homogenous construction.

The handle 10 of the rake may be connected with the head 2 in any suitable manner, as by the forked tank members 11, 11, extending inwardly of the central end portion of the handle and secured to the head 2 at each side of its center portion by rivets 12 extending through the longitudinal attaching terminals 13.

As thus constructed, the rake is very substantial and stiff, avoiding loosening of the rake teeth, and providing for the various strains incident to its use.

It will be understood that the proportions of the rake, the number and size of the teeth, the design and detail of the various parts or other features of the invention may be variously changed or modified by the skilled mechanic, but that all such changes are to be considered as within the scope of the following claims.

What I claim is:

1. In a rake of the class described, the combination with a plurality of teeth having head portions and laterally projecting lugs, of a surrounding head portion having openings engaging said lugs and clearance openings for the teeth shanks fixedly holding the teeth in position, substantially as set forth.

2. In a rake of the class described, the combination with the teeth having integral circular head portions and laterally projecting riveting portions, of a surrounding tubular head portion formed of a metallic blank having openings engaging the riveting portions and clearance notches for the teeth shanks, said blank being bent around the teeth head and welded along its meeting edges, substantially as set forth.

3. In a rake, the combination of a plurality of teeth having head portions provided with laterally projecting lugs, a retaining head therefor consisting of a tubular body portion having openings engaging the lugs and clearance notches for the teeth shanks and embracing the head and shank portions of the teeth, and a handle connected to the rake head, substantially as set forth.

In testimony whereof I hereunto affix my signature in the presence of two witnesses.

EDWARD G. CRONK.

Witnesses:
  W. D. BOWLBY,
  H. W. HALL.

Copies of this patent may be obtained for five cents each, by addressing the "Commissioner of Patents, Washington, D. C."